March 25, 1952    W. P. BURTON ET AL    2,590,087
RECOVERY OF ORGANIC ACIDS
Filed Nov. 14, 1946
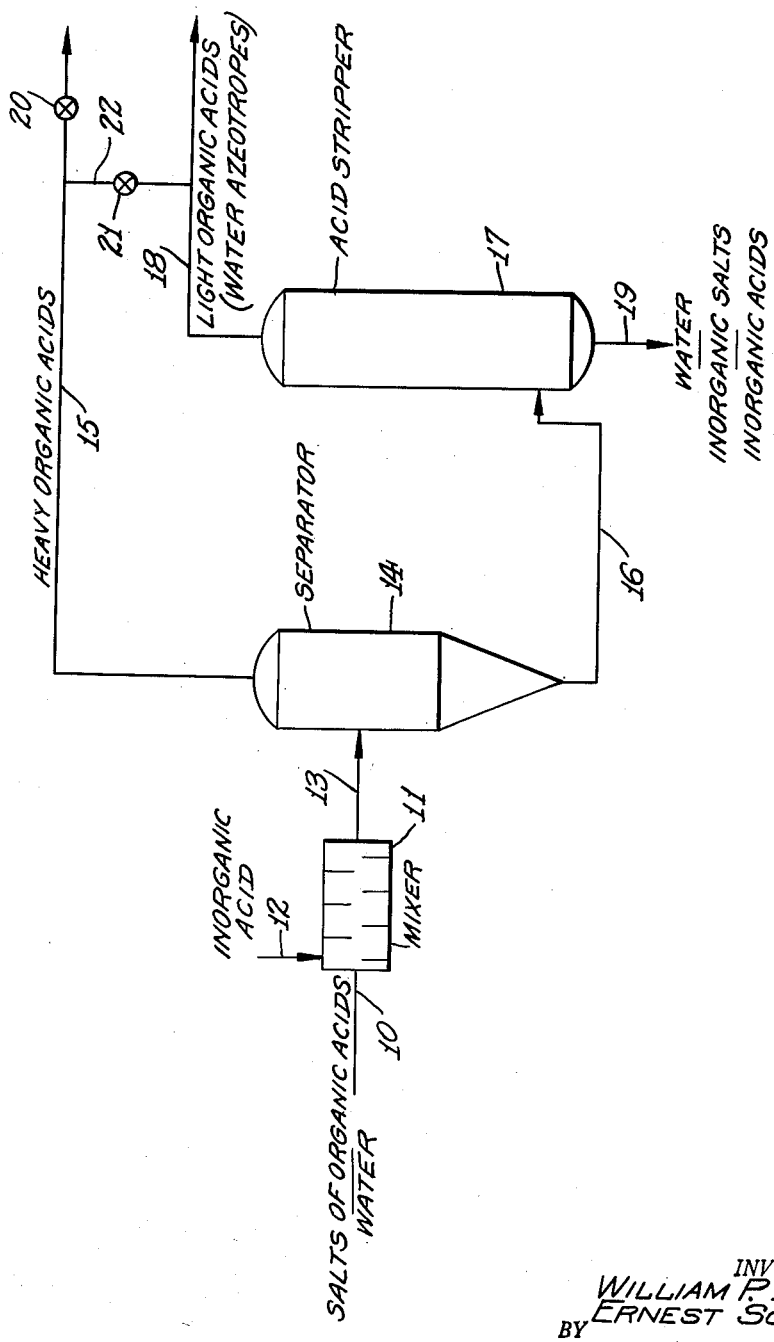
INVENTORS
WILLIAM P. BURTON
BY ERNEST SOLOMON
C. F. Liebrecht
ATTORNEY Patented Mar. 25, 1952

2,590,087

UNITED STATES PATENT OFFICE 2,590,087

RECOVERY OF ORGANIC ACIDS

William P. Burton, Orange, and Ernest Solomon, Nutley, N. J., assignors to The M. W. Kellogg Company, Jersey City, N. J., a corporation of Delaware Application November 14, 1946, Serial No. 709,882

5 Claims. (Cl. 260—450)

This invention relates to a process for the recovery of organic acids from their aqueous alkali salt solutions. It has particular reference to the separation of organic acids from their aqueous alkali salt solutions, which are obtained as products in the reduction of carbon monoxide with hydrogen in the presence of a catalyst at elevated temperatures.

In the production of oxygenated organic compounds obtained in the catalytic hydrogenation of carbon monoxide, mixtures of organic acids as their alkali salt solutions in water, are obtained as highly useful products. Such acids encompass a wide range of organic acids which, with the exception of acetic acid, form minimum boiling azeotropes with water, and which may be taken overhead upon distillation from their aqueous solutions. The recovery of organic acids from such solutions can be effected generally by a method of treating a mixture of the salts of these acids with an inorganic acid, and subjecting such mixture to distillation to obtain overheads comprising an aqueous mixture of light and heavy acids and bottoms comprising inorganic salts, inorganic acids and water.

However, we have found that such a method has marked disadvantages in many well-defined instances, making the recovery of organic acids from their aqueous alkali salt solutions, difficult and uneconomical. This is evidenced by the fact, that when distillation is effected by the aforementioned method in obtaining the separation of organic acids from their aqueous alkali salt solutions, large quantities of water are taken overhead with the acids, which must then be individually subjected to further distillation to effect separation between acids and water present. This condition arises in instances where, upon distillation of aqueous mixtures of light and heavy organic acids, the heavier acids tend to form azeotropes, taking over large quantities of water which must subsequently be removed to obtain recovery of non-aqueous organic acids. It is an object of this invention to provide an improved process for effecting efficient and economical recovery of organic acids from their aqueous alkali salt solutions. It is a further object of this invention to provide an improved process for effecting efficient and economical recovery of organic acids from their aqueous alkali salt solutions which are obtained as products in the catalytic hydrogenation of carbon monoxide at elevated temperatures.

We have found that water-free organic acids may be recovered from their aqueous alkali salt solutions by first treating these solutions with an inorganic acid having a boiling point higher than that of water, or with an inorganic acid which forms a maximum boiling azeotrope with water. The mixture of treated acids thus obtained, are next separated into a water-rich phase, comprising inorganic salts, inorganic acids and some of the lighter organic acids present, and an acid-rich phase, comprising water-insoluble heavy organic acids and the remaining portion of the lighter organic acids. Upon subsequent distillation, separation of lighter organic acids from the aqueous solution of inorganic salts and inorganic acids, may be effected. One advantage gained in the utilization of this process lies in the withdrawing of the acid-rich phase, substantially water-free, as overheads in the aforementioned separation step, without resorting to further distillation, which would otherwise be necessary where alkali salt solutions of organic acids are contacted with an inorganic acid and directly subjected to distillation to effect separation of individual organic acids. Thus, the necessity of removing large quantities of water from individual azeotrope-forming heavier organic acids, which have been taken overhead, is obviated. Another advantage of the invention lies in facilitating the separation of one or more of the lighter organic acids by prior removal of heavier acids.

The process of our invention comprises broadly the steps of (A) contacting an aqueous alkali salt solution of organic acids, with a high-boiling inorganic acid such as described above, (B) passing the mixture so obtained to a separation step to effect a separation between a water-rich phase comprising inorganic salts, inorganic acids and some of the lighter organic acids, and an acid-rich phase comprising water-insoluble heavy organic acids and the remaining portion of lighter organic acids, the latter phase being removed as overheads and (C) passing the water-rich phase to a distillation step in which lighter organic acids are stripped as their water azeotropes from the aqueous solution of inorganic salts and inorganic acids.

The accompanying drawing illustrates diagrammatically one form of the apparatus employed and capable of carrying out the process of our invention. The invention will be described in detail by reference to a process employing the apparatus illustrated in the drawing, but it should be noted that it is not intended that the invention be limited to the embodiment as illustrated but is capable of other embodiments which may extend beyond the scope of the apparatus illustrated in the drawing. Pumps, compressors, additional valves and other mechanical elements necessary to effect the transfer of liquids and vapors and to maintain the conditions of temperature and pressure necessary to carry out the function of the apparatus are omitted, in order to simplify the description. It will be understood, however, that much equipment of this nature is necessary and will be supplied by those skilled in the art.

Referring to the drawing, an aqueous alkali salt solution of organic acids, such as derived as products in the catalytic hydrogenation of carbon monoxide is transferred through line 10 into a mixer 11. Mixer 11 is provided to intimately mix the solution introduced through line 10 with an inorganic acid transferred through line 12 into mixer 11, in order to effect neutralization of the salts of organic acids. The inorganic acid thus introduced into mixer 11 may be a high-boiling inorganic acid having a boiling point higher than that of water, such as sulfuric acid, or an inorganic acid which forms a maximum boiling azeotrope with water, such as hydrochloric acid.

The resulting aqueous mixture from mixer 11 comprises free organic acids and salts of the introduced inorganic acid. This mixture is withdrawn from mixer 11 through line 13 and transferred to a separator 14. In separator 14 heavier organic acids will separate from the water solution by reason of their insolubility. They will also contain a portion of the lighter water-soluble organic acids by reason of the solvent action of heavier acids on the lighter acids. These acids, comprising an upper acid-rich phase in separator 14, are withdrawn overhead through line 15 from which they may be sent to any desired acid recovery system in which individual heavy acids may be recovered by fractionation in the manner known to those skilled in the art.

The lower water-rich phase in separator 14, comprising inorganic salts, the introduced inorganic acid and remaining lighter organic acids, is withdrawn as bottoms from separator 14 through line 16. The lower water-rich phase from separator 14 is then transferred through line 16 to a low point in a distillation tower 17 which functions as an acid stripper. Tower 17 is heated under conditions effective to distill overhead organic acids as their azeotropes where such acids contain three or more carbon atoms per molecule. These acids are withdrawn from tower 17 through line 18 from which they may also be sent to any desired acid recovery system to effect separation of individual organic acids present. Bottoms from tower 17, comprising inorganic salts, excess quantities of the introduced inorganic acid and excess water, are withdrawn through line 19 for further use or treatment outside the scope of the present process. It should be noted that where acetic acid is present in the mixture entering separator 14 through line 13, the distribution of this acid between acid and aqueous phases in separator 14, is such as to leave an appreciable portion of the acetic acid in the acid phase. Hence, acetic acid will also be taken overhead from separator 14 through line 15. Similarly, acetic acid present in the lower aqueous phase in separator 14 will also be taken as bottoms from tower 17 through line 19. Organic acids having less than three carbon atoms per molecule do not form minimum boiling azeotrope with water and, therefore, would not be taken overhead from tower 17.

As described above, overheads from separator 14 and tower 17 may be separately subjected to further treatment in the manner known to those skilled in the art, for effecting subsequent recovery of individual organic acids present. However, it is possible to combine these overheads and to pass the total stream thus obtained to any desired acid concentrating and recovery system to effect subsequent separation of individual organic acids. We have, accordingly, provided a valve 20 in line 15 and a valve 21 in line 22 which connects line 15 with line 18. It is, therefore, possible by proper manipulation of valves 20 and 21 to combine the aforementioned overheads from separator 14 and tower 17 for further treatment in the manner indicated above.

Although the invention has particular applicability to a process for the separation of organic acids from their aqueous alkali salt solutions obtained as products in the catalytic hydrogenation of carbon monoxide, it should be noted that the process may also be applied in the separation of any mixture of organic acids from their aqueous alkali salt solutions, where such acids contain two or more carbon atoms per molecule, without regard to the source from which such acids have been obtained. While we have described a particular embodiment of our invention for purposes of illustration, it should be understood that various modifications and adaptations thereof, which will be obvious to one skilled in the art, may be made within the spirit of the invention as set forth in the appended claims.

We claim:

1. In the separation of organic acids from aqueous solutions of their alkali salts, the process comprising the steps of: contacting an aqueous solution of alkali salts of water-soluble and water-insoluble organic acids, each of said acids having at least 2 carbon atoms per molecule, with an inorganic acid to acidify said solution; separating the mixture thus obtained into an acid-rich phase comprising water-insoluble organic acids and a water-rich phase comprising inorganic salts and water-soluble organic acids; separating said phases; and distilling said water-rich phase to separate substantially all water-soluble organic acids having at least 3 carbon atoms per molecule as their water azeotropes from the remaining aqueous solution.

2. In the separation of organic acids from aqueous solutions of their alkali salts, the process comprising the steps of: contacting an aqueous solution of alkali salts of acetic and higher boiling water-soluble organic acids and water-insoluble organic acids with an inorganic acid to acidify said solution; separating the mixture thus obtained into an acid-rich phase comprising water-insoluble organic acids and a portion of said water-soluble organic acids and a water-rich phase comprising inorganic salts and the remaining portion of said water-soluble organic acids; separating said phases; and distilling said water-rich phase to separate substantially all water-soluble organic acids having at least 3 carbon atoms per molecule as their water azeotropes from the remaining aqueous solution.

3. In a process for the hydrogenation of carbon monoxide in which water-soluble and water-insoluble organic acids are produced, each of said acids having at least 2 carbon atoms per molecule, and in which an aqueous solution of the alkali salts of said acids is obtained in the treatment of the hydrogenation product, the process comprising the steps of: contacting said aqueous solution of alkali salts with an inorganic acid to acidify said solution; separating the mixture thus obtained into an acid-rich phase comprising water-insoluble organic acids and a water-rich phase comprising inorganic salts and water-soluble organic acids; separating said phases; and distilling said water-rich phase to separate substantially all water-soluble organic acids having at least 3 carbon atoms per molecule as their water azeotropes from the remaining aqueous solution.

4. In a process for the hydrogenation of carbon monoxide in which acetic and higher boiling water-soluble organic acids and water-insoluble organic acids are produced and in which an aqueous solution of the alkali salts of said acids is obtained in the treatment of the hydrogenation product, the process comprising the steps of: contacting said aqueous solution of alkali salts with an inorganic acid to acidify said solution; separating the mixture thus obtained into an acid-rich phase comprising water-insoluble organic acids and a portion of said water-soluble organic acids and a water-rich phase comprising inorganic salts and the remaining portion of said water-soluble organic acids; separating said phases; and distilling said water-rich phase to separate substantially all water-soluble organic acids having at least 3 carbon atoms per molecule as their water azeotropes from the remaining aqueous solution.

5. The process of claim 1 wherein said acid-rich phase is combined with said water-azeotropes of organic acids containing at least three carbon atoms per molecule.

WILLIAM P. BURTON.
ERNEST SOLOMON.

REFERENCES CITED

The following references are of record in the file of this patent:

UNITED STATES PATENTS

| Number | Name | Date |
|---|---|---|
| 1,828,356 | Burwell | Oct. 20, 1931 |
| 1,912,484 | James | June 6, 1943 |
| 2,052,165 | Carrier et al. | Aug. 25, 1936 |
| 2,059,232 | Harder | Nov. 3, 1936 |
| 2,186,249 | Lazar et al. | Jan. 9, 1940 |
| 2,288,769 | Alleman et al. | July 7, 1942 |
| 2,433,449 | Mosesman | Mar. 23, 1948 |

FOREIGN PATENTS

| Number | Country | Date |
|---|---|---|
| 276,617 | Great Britain | Mar. 29, 1928 |

OTHER REFERENCES

Koch et al.: Brennstoff-Chemie, vol. 16, No. 20, 382–387 (1935).